United States Patent [19]
Horlein et al.

[11] 3,899,489
[45] Aug. 12, 1975

[54] HEXAHYDROTRIAZINONE DERIVATIVES

[75] Inventors: Gerhard Horlein, Frankfurt am Main; Peter Langeluddeke, Diedenbergen; Hubert Schonowsky, Neu-Isenburg; Adolf Studeneer, Kelkheim, Taunus, all of Germany

[73] Assignee: Hoechst Aktiengesellschaft, Frankfurt am Main, Germany

[22] Filed: Apr. 30, 1973

[21] Appl. No.: 355,915

[30] Foreign Application Priority Data
May 4, 1972 Germany............... 2221787

[52] U.S. Cl.............................. 260/248 NS; 71/93
[51] Int. Cl.²....................................... C07D 251/06
[58] Field of Search............................. 260/248 NS

[56] References Cited
UNITED STATES PATENTS
3,505,057  4/1970  Luckenbaugh................. 260/248 X
3,505,323  4/1970  Luckenbaugh..................... 260/248

FOREIGN PATENTS OR APPLICATIONS
1,249,003   3/1968   Germany

*Primary Examiner*—John M. Ford
*Attorney, Agent, or Firm*—Curtis, Morris & Safford

[57] ABSTRACT

Hexahydrotriazinones of the formula

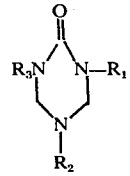

in which $R_1$ and $R_2$ are substituted or unsubstituted alkyl or alkenyl, and $R_3$ is haloalkyl-phenyl, haloalkoxy-phenyl, haloalkylthio-phenyl or halovinyloxy-phenyl or carbomethoxythienyl, are valuable herbicides.

14 Claims, No Drawings

HEXAHYDROTRIAZINONE DERIVATIVES

According to German Patent 1.249.003 certain hexahydrotriazinone derivatives of the formula

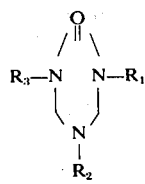

are useful as total and selective herbicides in certain crops (such as cotton, oat and wheat) for preemergence and postemergence application.

Subject of the present invention are new hexahydrotriazinone derivatives of the formula

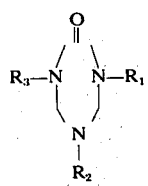

in which $R_1$ and $R_2$ each are alkyl having 1 – 4 carbon atoms or alkenyl having 3 to 4 carbon atoms both optionally substituted by one —$OCH_3$, —$SCH_3$, or —CN group $R_3$ represents the group

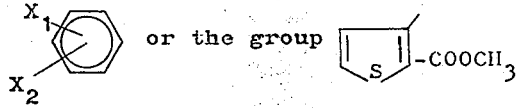

in which $X_1$ is hydrogen, fluoroalkoxy- or fluoroalkylthio containing each 1–3 carbon atoms, 2 to 6 fluorine atoms and optionally further halogen atoms, especially 1 or 2 chlorine atoms, or halogenated vinyloxy, preferably chlorinated once or twice, $X_2$ is hydrogen, halogen, —$CH_3$, —$CF_2Cl$ or $CF_3$, at least one of the radicals $X_1$ and $X_2$ being other than hydrogen.

The compounds of the invention have an excellent selective herbicidal effect even at high dosages both in preemergence or postemergence application, which means that crop plants are spared whilst growth of undesired plants (weeds) is completely destroyed. This is true especially for a number of important large-scale crops such as wheat, cotton, corn and leguninosae.

Among the weeds that are successfully combated with the new compounds are both dicotyledonous (broad-leafed) weeds such as *Ipomoea purpurea* (animal morning glory), *Amaranthus retroflexus* (red-root pigweed) *Bidens pilosa* (beggar-ticks) *Xanthium spp.* (cocklebur), *Sida spinosa* (prickly sida), *Polygonium spp.* and *Chenopodium album* as well as monocotyledonous (grassy) weeds such as *Echinochloa crus-galli* (barnyard grass), *Digitaria sanguinalis* (crabgrass) Seteria spp. (foxtail millet) and *Poa annua* (annual meadow grass).

The amounts necessary to achieve the desired results may vary within wide limits, between 0.1 to 10 kgs of active substance per ha; preferably between 0.25 – 5 kgs per ha.

The compounds of the formula I. and herbicidal preparations containing them, are of special advantage due to their favorable toxicity for warm-blooded animals.

A further subject of the present invention are also herbicidal preparations containing a compound of the formula I as active agent.

The compounds of the invention may be prepared by methods known per se. In a preferred process substituted ureas of the general formula

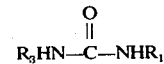

are reacted with twice the molar amount of formaldehyde and one molar amount of a primary amine of the formula $H_2NR_2$ according to the following reaction scheme:

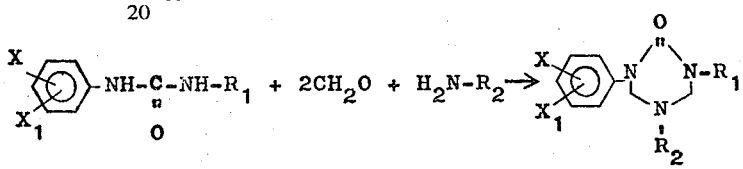

The herbicidal compositions of the invention contain generally from 2 – 95 wt. percent of an active agent of the formula I. They may be used in the form of wettable powders, emulsifiable concentrates, spray solutions, dusting powders or granules in combination with the usual formulation auxiliaries.

Wettable powders are preparations which are homogeneously dispersible in water, and which, in addition to the active ingredient and a diluent or inert substance, contain also wetting agents, for example polyoxethylated alkyl-phenols, polyoxethylated oleyl or stearyl amines, or alkyl- or alkylphenyl-sulfonates, and dispersing agents, for example the sodium salts of ligninsulfonic acid, 2,2'-dinaphthyl-methane6,6'-disulfonic acid, butyl-naphthalene-sulfonic acid, or olmethyltaurine.

Emulsifiable concentrates may be obtained by dissolving the active ingredient in an organic solvent, for example butanol, cyclohexanone, dimethylformamide, xylene, or in a higher boiling aromatic hydrocarbon. In order to obtain a good suspension or emulsion in water, further wetting agents from the above series is preferably added.

Dusting powders are obtained by grinding the active ingredient with finely divided solid substances, for example talcum or natural aluminates, for example kaolin, bentonite, pyrophyllite, or diatomaceous earth.

Spraying solutions, commercially available as aerosol sprays, contain the active ingredient dissolved in an organic solvent, and a propellant, for example a mixture of fluorochloro-hydrocarbons.

Granules may be obtained either by atomizing the active ingredient through a nozzle onto an absorptive granulated inert material, or by applying a concentrate of the active ingredient by means of an adhesive, for example polyvinyl alcohol, the sodium salt of polyacrylic acid, or mineral oils, onto the surface of a carrier, for example, sand, kaolinites, or granulated inert materials. The active substances may also be granulated by the methods used in the preparation of fertilizer granulated material, if desired in admixture with fertilizers.

The concentration of the active ingredients in the commercially available preparations may vary considerably. For example, in wettable powders the concentration of active ingredient may vary within the range of from about 10 to 90 percent, the remaining amount consisting of the a.m. additives. In emulsifiable concentrates, the concentration of active ingredient may vary in the range of from about 10 to 80 percent. Dusting powders generally contain from 5 to 20 %, spray solutions from about 2 to 20 percent, of active ingredient.

In the case of granules, the content of active ingredient depends on the fact whether the active compound is liquid or solid and on what granulating agents, fillers and other additives are used.

For practical applications, the commercially available concentrates are diluted in the usual manner, for example, in the case of wettable powders and emulsifiable concentrates, by means of water. Dust formulations, granulated preparations and spray solutions are not diluted with further inert substances before their application. The amount of active ingredient required for application varies in accordance with the external conditions, for example temperature and moisture; generally from 0.015 to 0.25 g/m$^2$, preferably from 0.03 to 0.12 g/m$^2$, of active substance is used. Furthermore, the compounds of the invention may be combined with other herbicides and/or soil insecticides.

Known herbicides which are suitable for combination with the compounds used in the process of the invention are, for example: (indicated by their common or chemical names)

| | |
|---|---|
| Urea derivatives: | linuron, chloroxuron, monolinuron, fluometuron, diuron; |
| Triazine derivatives: | simazine, atrazine, ametryne, prometryne, desmetryne, methoprotryne; |
| Uracil derivatives: | lenacil, bromacil; |
| Pyrazon derivatives: | 1-phenyl-4-amino-5-chloro-pyrazidone-(6); |
| Growth-promoting preparations: | 2,4-dichloro-phenoxy-acetic acid, 4-chloro-2-methyl-phenoxy-acetic acid, 2,4,5-trichloro-phenoxy-acetic acid, 4-chloro-2-methyl-phenoxy-butyric acid, 2,3,6-trichlorobenzoic acid; |
| Carbamic acid derivatives: | barban, phenmedipham, triallate, diallate, vernolate, 2-chloroallyl-N,N-diethyl-dithiocarbonate and Swep; |
| Dinitrophenol derivatives: | dinitro-o-cresol, dinoseb or dinoseb-acetate; |
| Chlorinated aliphatic acids: | sodium trichloro-acetate, dalapon (sodium salt of 2,2-dichloropropionic acid); |
| Amides: | diphenamide, N,N-diallyl-chloroacetamide; |
| Dipyridylium derivatives: | paraquat, diquat, morfamquat; |
| Anilides: | N-(3,4-dichlorophenyl)-methacrylamide, propanil, solan, monalide, 2-chloro-2',6'-diethyl-N-(methoxymethyl)-acetanilide, propachlor, |
| Nitriles: | dichlobenil, ioxynil; |
| Other preparations: | flurenol, monosodium-methyl-arsonate, trifluralin, bensulide, 3,4-dichloro-proprionanilide, and 4-trifluoromethyl-2,4'-dinitrodiphenyl ether. |

Another application form for the active substances of the invention is in a mixture with one or more fertilizers, thus obtaining fertilizing agents which simultaneously have a herbicidal action.

The following Examples illustrate the invention. Examples of formulation

EXAMPLE 1:

A wettable powder easily dispersible in water is obtained by mixing 25 parts by weight of 1-[3-(1',1',2',2'-tetrafluoroethoxy)phenyl]-3,5-dimethylhexahydrotriazinone-2 as active agent, 64 parts by weight of kaoline-containing quartz as inert component, 10 parts by weight of the potassium salt of ligninsulfonic acid and 1 part by weight of the sodium salt of oleylmethyltaurine as wetting and dispersing agent and grinding same in a disk attrition mill.

EXAMPLE 2:

A dusting powder well suitable for being used as weed killer, is obtained by mixing 10 parts by weight of 1-[3-(1',1',2',2'-tetrafluoroethoxy)phenyl]-3,5-dimethylhexahydrotriazinone-2 as active agent and 90 parts by weight of talc as inert substance and by grinding it in a cross beater mill.

EXAMPLE 3:

An emulsifiable concentrate is composed of 15 parts by weight of 1-[3-(1',1',2',2'-tetrafluoroethoxy)phenyl]-3,5-dimethylhexahydrotriazinone-2 as active agent, 75 parts by weight of cyclohexanone as solvent and 10 parts by weight of oxethylated nonylphenol (10 EO) as emulsifier.

EXAMPLES OF PREPARATION 1. 1-3-(1',1',2',2'-tetrafluoroethoxy)-phenyl-3,5-dimethylhexahydrotriazinone-2

42.5 Grams (0.16 mole) of N-3-(1',1',2',2'-tetrafluoroethoxy)-phenyl-N'-methyl urea were dissolved in 200 ml of dimethyl formamide and then 32 g of a 30 percent aqueous solution of formaldehyde were added. At room temperature stirring was continued for half an hour. Subsequently, 16 ml of an aqueous methylamine solution (at 35 percent) were added dropwise. The reaction mixture was agitated at room temperature for 3 hours and then heated to 100°C for another 2 hours. The solution was filtered and concentrated in vacuo.

51 Grams of an oil ($n_D^{20}$ : 1.4920) were obtained.

In an entirely analogous manner the following compounds were obtained:

| Compound | $X_1$ | $X_2$ | $R_1$ | $R_2$ | $n_D^{20}$ |
|---|---|---|---|---|---|
| 2 | 3—HCF$_2$—CF$_2$—O— | H | —CH$_3$ | —CH(CH$_3$)$_2$ | 1.4968 |
| 3 | " | H | —CH$_3$ | —(CH$_2$)$_2$—OCH$_3$ | 1.4930 |
| 4 | " | H | —CH$_3$ | —CH$_2$—CH=CH$_2$ | 1.4992 |
| 5 | " | H | —CH$_3$ | —C(CH$_3$)$_3$ | 1.4943 |
| 6 | " | H | —CH$_3$ | —(CH$_2$)$_3$—CH$_3$ | 1.4923 |
| 7 | " | H | —C$_2$H$_5$ | —CH(CH$_3$)$_2$ | 1.4951 |
| 8 | " | H | —C$_3$H$_7$(n) | —CH(CH$_3$)$_2$ | 1.4915 |
| 9 | " | H | —CH$_2$—CH=CH$_2$ | —CH(CH$_3$)$_2$ | 1.4944 |
| 10 | " | H | —C$_2$H$_5$ | —CH$_3$ | 1.4800 |
| 11 | " | H | —C$_3$H$_7$(n) | —CH$_3$ | 1.4876 |
| 12 | " | H | —CH$_2$—CH(CH$_3$)(OCH$_3$) | —CH$_3$ | 1.4941 |

—CONTINUED

| Compound | $X_1$ | $X_2$ | $R_1$ | $R_2$ | $n_D^{20}$ |
|---|---|---|---|---|---|
| 13 | " | H | —CH$_2$—C(CH$_3$)$_2$—CN | —CH$_3$ | 1.5045 |
| 14 | " | H | —C$_4$H$_9$(n) | —CH$_3$ | 1.4890 |
| 15 | " | H | —CH$_3$ | —C$_2$H$_5$ | 1.4965 |
| 16 | " | H | —CH$_3$ | —C$_3$H$_7$(n) | 1.4921 |
| 17 | 4—HCF$_2$—CF$_2$—O— | 3—CH$_3$— | —CH$_3$ | —CH$_3$ | — |
| 18 | 3—CF$_3$—CFH—CF$_2$O— | H | —CH$_3$ | —CH$_3$ | 1.4874 |
| 19 | 3—CF$_3$—CFH—CF$_2$O— | H | —C(CH$_3$)$_3$ | —CH$_3$ | 1.4675 |
| 20 | 4—CF$_3$—CFH—CF$_2$—O— | 3—Cl | —CH$_3$ | —CH$_3$ | — |
| 21 | " | 3—CF$_3$ | —CH$_3$ | —CH$_3$ | — |
| 22 | 3—HClCF—CF$_2$—O— | H | —CH$_3$ | —CH$_3$ | 1.5175 |
| 23 | " | H | —(CH$_2$)$_2$—SCH$_3$ | —C(CH$_3$)$_3$ | 1.5256 |
| 24 | " | 3—CF$_3$ | —CH$_3$ | —CH$_3$ | — |
| 25 | 3—HCFCl—CF$_2$—S— | H | —CH$_3$ | —CH$_3$ | — |
| 26 | 3—CFH—CF$_2$—O— | H | —CH$_3$ | —CH$_3$ | — |
| 27 | 3—HCCl$_2$—CF$_2$—O— | H | —(CH$_2$)$_2$SCH$_3$ | —CH$_3$ | 1.5448 |
| 28 | 3—HCCl$_2$—CF$_2$—S— | H | —CH$_3$ | —CH$_3$ | — |
| 29 | 4—HCCl=CCl—O— | H | —CH$_3$ | —CH$_3$ | 1.5789 |
| 30 | 4—CF$_3$O— | 3—Cl | —CH$_3$ | —CH$_3$ | — |
| 31 | 4—CF$_3$S— | H | —CH$_3$ | —CH$_3$ | — |
| 32 | 3—HCF$_2$O— | H | —CH$_3$ | —CH$_3$ | 1.4947 |
| 33 | 4—HCF$_2$O— | H | —CH$_3$ | —CH$_3$ | — |
| 34 | " | 3—Cl | —CH$_3$ | —CH$_3$ | 1.5325 |
| 35 | 4—HCF$_2$O— | —CH$_3$ | —CH$_3$ | —CH$_3$ | — |
| 36 | H | 3—CF$_2$Cl— | —CH$_3$ | —CH$_3$ | — |
| 37 | H | 3—CF$_2$Cl— | —(CH$_2$)$_2$—SCH$_3$ | —CH$_3$ | 1.5538 |
| 38 | 4—HCF$_2$O— | 3—Cl | —CH$_3$ | —C$_2$H$_5$ | — |
| 39 | H | 3—Cl | —CH$_3$ | —CH$_3$ | known from German Patent 1 249 003 |
| 40 | 3—Cl | 4—Cl | —CH$_3$ | —CH$_3$ | |
| 41 | 4—CH$_3$ | H | —CH$_3$ | —CH$_2$—CH=CH$_2$ | |
| 42 | 4—CH$_3$ | H | —C$_4$H$_9$(n) | —CH$_2$—CH=CH$_2$ | |

Compound No. 43

1-[2-carbomethoxythienyl-3-]-3,5-dimethylhexahydro-triazinone-2

34.2 Grams (0.16 mole) of N-2 carbomethoxythienyl-3-N'methyl urea, prepared from 3-aminothiophen-2-carboxylic acid methyl ester (German Pat. No. 10,055,007) and methylisocyanate, were dissolved in 200 ml of dimethylformamide and then 32 g of a 30 % aqueous solution of formaldehyde were added. For half an hour stirring is continued at room temperature. Then 16 ml of a solution of methylamine (at 35 percent) was added dropwise. The reaction mixture was agitated at room temperature for 3 hours and thereafter heated to 100°C for another 2 hours. The solution was filtered and concentrated in vacuo. 38 Grams of an oil ($n_D^{20}$ : 1.5668) were obtained;

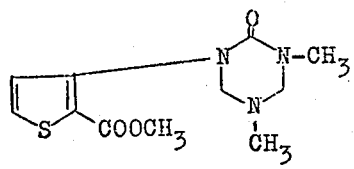

Examples of Application

EXAMPLE I: (premergence)

Seeds of weeds and crop plants were sown in loam filled pots. The loam surface was then sprayed with aqueous suspensions of wettable powder formulations of compounds 1 and 2. As comparative agent

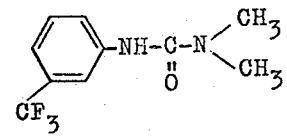

(fluometuron)

was used in the same way. The pots were placed in a greenhouse. After four weeks the following result was obtained expressed as degree of damage in percent (that is 0 = no damage, 100 = killed), see table I.

TABLE I:

| Compound No. | Dosages in kg/ha of active agents | cotton | Damage to weeds and crop plants Weeds | | | | | | | |
|---|---|---|---|---|---|---|---|---|---|---|
| | | | Echino-chloa | Setaria | Ama-ran-thus | Cheno-podium | Bidens | Tage-tes | Xan-thium | Ipo-moea | Ses-bania |
| 1 | 0.31 | 0 | 80 | 100 | 100 | 100 | 100 | 100 | 100 | 100 | 100 |
| | 0.62 | 0 | 99 | 100 | 100 | 100 | 100 | 100 | 100 | 100 | 100 |
| | 1.25 | 0 | 100 | 100 | 100 | 100 | 100 | 100 | 100 | 100 | 100 |
| | 2.5 | 0 | | | | | | | | | |
| 2 | 0.31 | 0 | 90 | 80 | 100 | 100 | 90 | 70 | 90 | 100 | 100 |
| | 0.62 | 0 | 95 | 90 | 100 | 100 | 100 | 100 | 100 | 100 | 100 |
| | 1.25 | 0 | 100 | 100 | 100 | 100 | 100 | 100 | 100 | 100 | 100 |
| | 2.5 | 0 | | | | | | | | | |
| Fluometuron | 0.31 | 0 | 85 | 90 | 100 | 100 | 100 | 20 | 100 | 100 | 100 |
| | 0.62 | 30 | 100 | 95 | 100 | 100 | 100 | 65 | 100 | 100 | 100 |
| | 1.25 | 70 | 100 | 100 | 100 | 100 | 100 | 100 | 100 | 100 | 100 |
| | 2.5 | 85 | | | | | | | | | |

Thus, as an average, compounds of the invention were similarly efficient as weed killers as compared to fluometuron which is widely used for protecting cotton crops. However, whereas an overdose of fluometuron caused drastic damage in the crop plants, they remained unharmed when treated with equal overdoses of the compounds of the invention.

EXAMPLE Ia (preemergence)

Cotton seeds were sown in pots containing pure sand and some mineral fertilizer and treated with 5 kg/ha of the compound 1. For comparison the same dosage of fluometuron was used. In this manner, the adsorption of herbicidal active agents on particles of clay and humus occuring in a normal soil could not take place here.

Within 4 weeks after the application, the plants treated with fluometuron had withered almost completely, whilst the plants treated with compound 1 showed but very slight damage.

EXAMPLE II (preemergence)

In the same way as described in Example I, wettable powder formulations of compounds 1, 2, 32, and 34 were sprayed.

Within 4 weeks after the treatment the following results were showing - degree of damage expressed in percent - see Table II (dosages indicated in kg/ha of active agent):

TABLE II

| Plant variety | Nr. 1 1.25 | 0.62 | Nr. 2 1.25 | 0.62 | Nr. 32 1.25 | 0.62 | Nr. 34 1.25 | 0.62 |
|---|---|---|---|---|---|---|---|---|
| Weeds: | | | | | | | | |
| Ipomoea | 100 | 100 | 100 | 100 | 100 | 100 | 100 | 100 |
| Sinapis | 100 | 95 | 100 | 95 | 100 | 100 | 100 | 100 |
| Anthemis | 100 | 100 | 100 | 100 | 100 | 100 | 100 | 100 |
| Amaranthus | 100 | 100 | 100 | 100 | 100 | 100 | 100 | 100 |
| Chenopodium | 100 | 100 | 100 | 100 | 100 | 100 | 100 | 100 |
| Mercurialis | 100 | 100 | 100 | 100 | 100 | 100 | 100 | 90 |
| Alopecurus | 95 | 85 | 90 | 75 | 100 | 90 | 85 | 45 |
| Echinochloa | 100 | 90 | 90 | 85 | 95 | 90 | 100 | 90 |
| Poa | 90 | 85 | 100 | 90 | 100 | 95 | 95 | 80 |
| Lolium | 100 | 100 | 100 | 95 | 100 | 100 | 100 | 90 |
| Crop plants: | | | | | | | | |
| corn | 20 | 0 | 25 | 0 | 40 | 20 | 0 | 0 |
| sorghum | 30 | 10 | 25 | 0 | 50 | 30 | 50 | 30 |
| barley | 80 | 40 | 20 | 10 | 0 | 0 | 20 | 10 |
| wheat | 70 | 35 | 20 | 0 | 0 | 0 | 30 | 20 |
| beans | 50 | 0 | 10 | 0 | 30 | 10 | 30 | 20 |
| peas | 0 | 0 | 0 | 0 | 25 | 0 | 30 | 0 |
| soja | 0 | 0 | 25 | 0 | 40 | 10 | 30 | 0 |
| cotton | 0 | 0 | 0 | 0 | 0 | 0 | 0 | 0 |

The figures shown in this table show the good weed-killing effect of the claimed compositions and their selectivity when used in cotton, leguminosae, corn, sorghum, and wheat.

EXAMPLE III (postemergence)

Compound 1 was tested in a field cultivated partially with spring barley and partially with spring wheat and well infested by weeds. Treatment was applied 4 weeks after sowing when the wheat plants had formed 3 or 4 leaves. The test results were evaluated 5 weeks after spraying. Comparative agent was

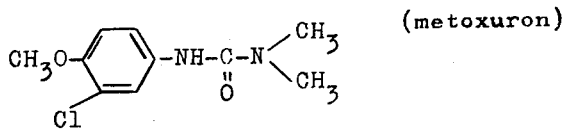

(metoxuron)

TABLE III

| (Degree of damage in %, average values out of two partial lots each) | | | |
|---|---|---|---|
| | No. 1 | | Metoxuron |
| | 2 kg/ha | 1.5 kg/ha | 2 kg/ha | 1.5 kg/ha |
| Charlock | 96–99 | 93–96 | 80–93 | 70–87 |
| Fat hen | 96–99 | 87–93 | 80–93 | 80–87 |
| Corn mayweed | 100 | 96–99 | 80–93 | 70–87 |
| knot weed | 96–100 | 93–99 | 70–87 | 50–70 |
| chick weed | 100 | 93–96 | 96–99 | 87–93 |
| pennicress | 100 | 96–100 | 93–96 | 80–93 |
| goose grass | 93–96 | 80–93 | 87–93 | 70–87 |
| wheat | 0 | 0 | 0 | 0 |
| barley | 0 | 0 | 0 | 0 |

The figures show that the composition according to the invention has a superior weed-killing effect when applied by the postemergence method and that it is well tolerated by spring grain.

EXAMPLE IV (preemergence)

The compounds 3, 9, 8, 7, 5, 4, 6, and 43 were applied in the manner described in Examples I and II.

The following results were obtained 4 weeks after treatment (see Tables IVa and IVb).

These results show that the compounds according to the invention effectively combat a wide range of weed varieties while sparing crop plants such as wheat, cotton, dwarf bush beans, soja beans, and corn.

EXAMPLE V (preemergence)

Seeds of weed and crop plants were sown in pots filled with loam. On the day of sowing, wettable powder formulations of compound 1 and of the comparative known compounds 39, 40, 41, and 42, suspended in water, were sprayed on the soil surface.

4 Weeks after treatment the following results expressed by degree of damage in %, were obtained (see Table V).

The results show that compound 1 has a superior selective herbicidal effect in comparison to known compounds. Especially the known compounds 41 and 42 showed very poor efficiency only.

TABLE IVa

Weed-killing effect (degree of damage in %) and tolerance by crop plants
dosages of active agent in kg/ha

| Variety of Plant | Nr. 3 2.5 | Nr. 3 1.25 | Nr. 9 2.5 | Nr. 9 1.25 | Nr. 8 2.5 | Nr. 8 1.25 | Nr. 7 2.5 | Nr. 7 1.25 |
|---|---|---|---|---|---|---|---|---|
| Weeds: | | | | | | | | |
| Ipomoea | 100 | 85 | 100 | 80 | 100 | 85 | 100 | 100 |
| Sinapis | 100 | 95 | 100 | 80 | 100 | 75 | 100 | 95 |
| Poa | 90 | 80 | 80 | 50 | 90 | 75 | 90 | 80 |
| Anthemis | 100 | 100 | 100 | 100 | 100 | 100 | 100 | 100 |
| Alopecurus | 100 | 85 | 75 | 65 | 95 | 75 | 100 | 90 |
| Lolium | 100 | 85 | 100 | 80 | 100 | 85 | 100 | 95 |
| Amaranthus | 100 | 100 | 95 | 85 | 100 | 80 | 100 | 85 |
| Chenopodium | 100 | 100 | 100 | 90 | 100 | 100 | 100 | 100 |
| Mercurialis | 100 | 100 | 100 | 80 | 100 | 85 | 100 | 100 |
| Crop plants: | | | | | | | | |
| Wheat | 0 | 0 | 30 | 20 | 10 | 0 | 50 | 40 |
| Cotton | 10 | 0 | 0 | 0 | 60 | 40 | 0 | 0 |
| Dwarf bush beans | 0 | 0 | 10 | 0 | 70 | 50 | 20 | 0 |
| Soja bean | 0 | 0 | 50 | 40 | 55 | 45 | 0 | 0 |
| Corn | 10 | 0 | 0 | 0 | 0 | 0 | 50 | 45 |

TABLE IVb

Weed-killing effect (degree of damage in %) and tolerance by crop plants
dosages in kg/ha of active agent

| Variety of plant | Nr. 5 2.5 | Nr. 5 1.25 | Nr. 4 2.5 | Nr. 4 1.25 | Nr. 6 2.5 | Nr. 6 1.25 | Nr. 43 2.5 | Nr. 43 1.25 |
|---|---|---|---|---|---|---|---|---|
| Weeds: | | | | | | | | |
| Ipomoea | 100 | 95 | 100 | 85 | 100 | 75 | 85 | 75 |
| Sinapis | 100 | 85 | 100 | 90 | 100 | 80 | 100 | 90 |
| Poa | 100 | 100 | 100 | 90 | 100 | 85 | 100 | 95 |
| Anthemis | 100 | 100 | 100 | 100 | 100 | 100 | 100 | 100 |
| Alopecurus | 100 | 85 | 100 | 80 | 80 | 70 | 75 | 65 |
| Lolium | 100 | 90 | 100 | 95 | 100 | 85 | 100 | 90 |
| Amaranthus | 100 | 100 | 100 | 100 | 100 | 100 | 100 | 95 |
| Chenopodium | 100 | 100 | 100 | 100 | 100 | 100 | 100 | 95 |
| Mercurialis | 100 | 80 | 100 | 100 | 100 | 80 | 100 | 100 |
| Crop plants: | | | | | | | | |
| Wheat | 0 | 0 | 10 | 0 | 15 | 10 | 0 | 0 |
| Cotton | 0 | 0 | 30 | 20 | 0 | 0 | 0 | 0 |
| Dwarf bush bean | 0 | 0 | 0 | 0 | 10 | 0 | 20 | 0 |
| Soja bean | 0 | 0 | 30 | 0 | 20 | 0 | 0 | 0 |
| Corn | 20 | 10 | 0 | 0 | 30 | 20 | 10 | 0 |

TABLE V

Weed-killing effect and tolerance by crop plants (Preemergence treatment)
Dosages of active agent in kg/ha

| Plant variety | Nr. 1 2.5 | Nr. 1 1.25 | Nr. 1 0.62 | Nr. 39 2.5 | Nr. 39 1.25 | Nr. 39 0.62 | Nr. 40 2.5 | Nr. 40 1.25 | Nr. 40 0.62 | Nr. 41 2.5 | Nr. 42 2.5 |
|---|---|---|---|---|---|---|---|---|---|---|---|
| Weeds: | | | | | | | | | | | |
| Polygonum | 100 | 90 | 60 | 95 | 80 | 50 | 50 | 40 | 30 | 0 | 0 |
| Amaranthus | 100 | 100 | 100 | 100 | 100 | 100 | 100 | 100 | 100 | 75 | 0 |
| Violoa | 100 | 100 | 100 | 100 | 90 | 75 | 85 | 80 | 75 | 30 | 0 |
| Ipomoea | 100 | 95 | 95 | 100 | 95 | 85 | 85 | 50 | 30 | 65 | 30 |
| Galium | 100 | 90 | 75 | 95 | 85 | 75 | 75 | 50 | 30 | 65 | 0 |
| Echinochloa | 100 | 100 | 90 | 100 | 85 | 75 | 100 | 90 | 85 | 30 | 30 |
| Lolium | 100 | 95 | 90 | 95 | 85 | 75 | 90 | 85 | 65 | 75 | 30 |
| Crop plants: | | | | | | | | | | | |
| Sorghum | 20 | 10 | 5 | 50 | 30 | 5 | 20 | 15 | 5 | | |
| Wheat | 10 | 5 | 5 | 70 | 35 | 10 | 0 | 0 | 0 | | |
| Barley | 20 | 5 | 5 | 70 | 65 | 50 | 10 | 0 | 0 | | |
| Celery | 10 | 0 | 0 | 100 | 85 | 50 | 100 | 95 | 85 | | |
| Carrots | 80 | 20 | 5 | 85 | 65 | 30 | 100 | 90 | 85 | no results | |
| Cotton | 5 | 0 | 0 | 5 | 0 | 0 | 10 | 0 | 0 | | |
| Peanut | 0 | 0 | 0 | 10 | 0 | 0 | 0 | 0 | 0 | | |
| Pea | 5 | 0 | 0 | 10 | 0 | 0 | 0 | 0 | 0 | | |
| Bean | 20 | 10 | 5 | 30 | 20 | 5 | 5 | 0 | 0 | | |

What is claimed is:

1. Hexahydrotriazinone compound of the formula

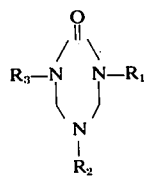

in which $R_1$ and $R_2$ each are alkyl having 1 - 4 carbon atoms or alkenyl having 3 to 4 carbon atoms, $R_3$ represents

in which $X_1$ is fluoroalkoxy- or fluoroalkylthio having 1 - 3 carbon atoms and containing 2 to 6 fluorine atoms, or halogenated vinyloxy, $X_2$ is hydrogen, halogen, $-CH_3$, $-CF_2Cl$ or $CF_3$.

2. The compound of claim 1 wherein each of $R_1$ and $R_2$ contain a member selected from the group consisting of H, $-OCH_3$, $-SCH_3$ and $-CN$.

3. The compound of claim 1 wherein the said fluoroalkoxy, fluoroalkylthio and halogenated vinyloxy contain 1 to 2 chlorine atoms.

4. The compound of claim 2 wherein the said fluoroalkoxy, fluoroalkylthio and halogenated vinyloxy contain 1 to 2 chlorine atoms.

5. The compound of claim 1 wherein $X_1$ is fluoroalkoxy.

6. The compound of claim 1 wherein $X_1$ is fluoroalkylthio.

7. The compound of claim 1 wherein $X_1$ is vinyloxy.

8. The compound of claim 1 wherein $R_3$ is

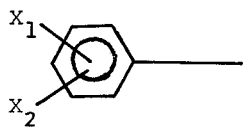

9. The compound of claim 1 wherein $R_3$ is

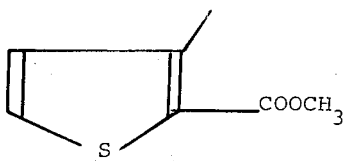

10. The compound defined in claim 1 which is 1-[3-(1′,1′,2′,2′-tetrafluoroethoxy)phenyl]-3,5-dimethylhexahydrotriazinone-2.

11. The compound defined in claim 1 which is 1-[4-(1′,1′,2′,2′-tetrafluoroethoxy)phenyl]-3,5-dimethylhexahydrotriazinone-2.

12. The compound defined in claim 1 which is 1-[3-(1′,1′,2′,3′,3′,3′-hexafluoropropoxy)phenyl]-3-tertiary butyl-5-methylhexahydrotriazinone-2.

13. The compound defined in claim 1 which is 1-[3-(1′,1′,2′-trifluoro-2′-chloroethoxy)phenyl]-3,5-dimethylhexahydrotriazinone-2.

14. The compound defined in claim 1 which is 1-(3-difluoromethoxyphenyl)-3,5-dimethylhexahydrotriazinone-2.

* * * * *